Figure 1:
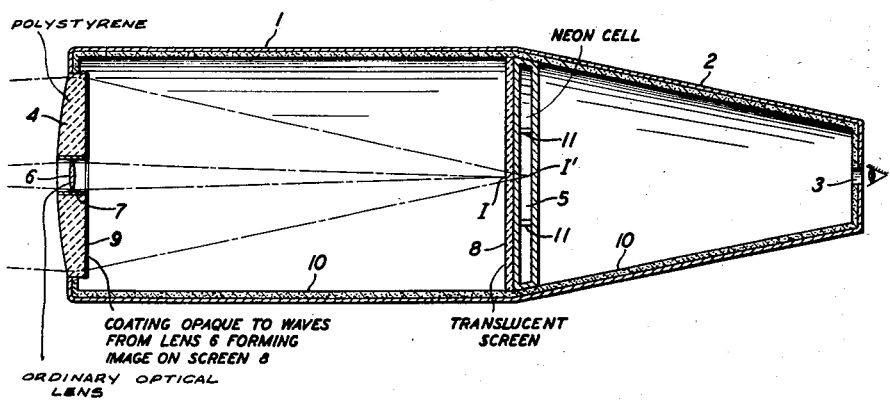

Feb. 23, 1960

A. M. SKELLETT 2,926,239

COMPOSITE IMAGE FORMING APPARATUS FOR VISIBLE
AND INVISIBLE ELECTROMAGNETIC WAVES

Filed Sept. 18, 1944

INVENTOR
ALBERT M. SKELLETT
BY:
ATTORNEY

United States Patent Office 2,926,239
Patented Feb. 23, 1960

2,926,239

COMPOSITE IMAGE FORMING APPARATUS FOR VISIBLE AND INVISIBLE ELECTROMAGNETIC WAVES

Albert M. Skellett, Madison, N.J., assignor to Bell Telephone Laboratories, Incorporated, New York, N.Y., a corporation of New York Application September 18, 1944, Serial No. 554,705

15 Claims. (Cl. 250—1)

This invention relates to means for utilizing electromagnetic waves emitted by, or reflected from, objects and more particularly to devices for simultaneously utilizing waves within one wavelength range to form an optical image and waves outside this range to give an observer additional information concerning the field being viewed.

An object of the invention is to provide novel means for utilizing electromagnetic waves received from an object or object field.

Another object is to provide means for forming a plurality of images with electromagnetic waves from an object field which images are formed with rays respectively within a plurality of wavelength ranges which plurality of images form in effect a single composite image.

A more specific object is to provide a viewing device which produces an ordinary optical image upon which is effectively superimposed an image formed by waves from the object which are of such length that the eye is not responsive thereto and converting this second image into one to which the eye responds.

In accordance with one embodiment of the invention which is chosen as illustrative and is described more at length below, a viewing device is provided in which an optical image is formed on a translucent screen by a lens element which is mounted within a central aperture in a relatively large lens for focussing short radio waves upon a device such as a neon cell which is capable of converting the received waves into light rays. The two images thus formed are simultaneously viewed by an observer from a position on the opposite side of the screen and cell from the lenses so that the two images are in register with each other.

One use which may be made of a device of this kind is for viewing an object field which is illuminated with light within the so-called visible spectrum and from which waves of longer length to which the eye is not sensitive are being emitted. These waves of longer length may emanate from only certain portions of the field and it may be desirable to know which portions of the field have the characteristics which will cause these waves to emanate therefrom. For example, one may wish to know whether radio waves are emanating from the field and from which parts of the field and with what relative intensities. Such parts are in effect sources of radio waves and one viewing the field will see images of these sources superimposed upon the ordinary optical image of the field so that their positions relative to the other objects in the field and their relative intensities may be observed. A viewing device of this kind may be used to view an antenna structure designed to confine the radiation to a lobe or lobes but which produces an objectionable minor lobe, with the result that the source of energy of this unwanted lobe may be immediately identified. Such lobes may be produced by direct radiation from the feed pipe, from reflections from a supporting structure, etc. and are difficult to trace by the usual methods.

Figure 2:
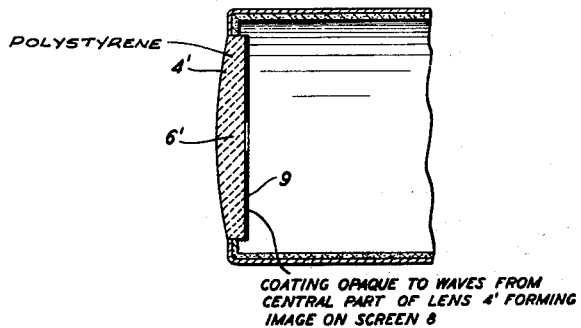

In the accompanying drawing, Fig. 1 is a longitudinal cross-sectional view of one embodiment of the invention in the form of a viewing device; and Fig. 2 is a similar but fragmentary view of the device of Fig. 1 showing a modified form of lens element.

Referring to Fig. 1, a generally cylindrical-shaped metal casing 1 has an extension 2 with an opening 3 through which an observer may view the screen assembly 5, 8. A relatively large circular lens 4 of dielectric material which is capable of focussing electromagnetic waves within the range of short, so-called radio waves is mounted within an opening in the end of casing 1. A suitable material for this lens is polystyrene but any other material adapted to suitably refract electromagnetic waves within the desired wavelength range may be used. The waves used for this purpose may be of the order of one to ten millimeters, for example. The lens 4 is designed to focus the waves received from a field being viewed upon a plane passing through a cell 5 containing gas (neon, for example) at such pressure that it becomes luminous when excited by these waves by the mechanism of the so-called electrodeless discharge. The walls of cell 5 are of glass or other suitable dielectric material which is capable of transmitting electromagnetic waves of the length of those received from lens 4 and also waves within the visible wavelength range so that the glow produced may be seen by an observer viewing the cell through the opening 3.

Lens 4 is provided with a central circular aperture within which is mounted in a casing member 7 an ordinary optical lens 6, which is preferably corrected for chromatic and other aberrations, the purpose of which is to form an optical image of the object field which is being viewed upon a translucent screen 8. This image is aligned with that formed by lens 4 with respect to the line of sight of the observer, so that the observer has the illusion of seeing a single image of the field being viewed. The lens element 6 may be a single lens or combination of lenses and its position within casing 7 may be made adjustable as may the position of lens element 4, as in ordinary cameras.

The lens element 4 is made opaque to the rays through lens 6 which form the visible image on screen 8. This may be accomplished, for example, by providing a suitable coating 9 on a surface of lens 4. This coating may be of any material which transmits waves of the length of those used to form the image on cell 5 and is opaque to the waves which form the image on screen 8. This screen 8 must be of material which transmits the waves used to form the image of cell 5—ground glass or tracing cloth, for example.

The interior walls of casing 1 are preferably made "black" to all rays entering the interior of this casing. One way of doing this is to provide a lining 10 of material which absorbs the wave energy, such as graphite containing a binder of plaster or other material, the combined substance having resistance sufficient to absorb the wave energy. Or the absorbing element may take the form of a thin membrane having relative high resistance by reason of its thinness, this membrane being spaced from the casing 1. The metal casing acts as a shield to screen the interior from stray radiation.

The voltage required to give a discharge in the gas in cell 5 decreases and the resolution obtained increases with the frequency of the waves used, so that it is desirable to employ relatively short waves. Cells of this kind have a breakdown threshold and a sustaining threshold, both of which decrease with frequency. The brightness of the discharge is a linear function of the field strength. Greater sensivity may be obtained by making use of some sort of keep-alive mechanism to provide a number of free electrons in the gas upon which the radio frequency waves can act. A faint discharge in the tube or irradiation by ultra-violet light may be used for this purpose. The faint discharge can be produced by providing electrodes within the cell connected to the terminals of a battery through adjustable resistance.

The cell preferably has spacers 11 to keep it from collapsing since the pressure within is low compared with atmospheric pressure.

The principle of lens 4 is that its thickness at every point is of the correct magnitude to introduce the proper phase delay in the transmission so that all elements of a plane wave front will arrive at the focus in exact phase coincidence. Let $r$ be the radial distance from the center of the lens to points or elemental portions of the lens along a radial portion thereof and $d$ a thickness of the material of the lens at any point such that if a wave (of length $\lambda$) were generated at the focus it would be slowed up by the dielectric at that point by an amount such that its energy would arrive at a plane outside the lens perpendicular to the axis in exact phase coincidence with that for all other values of $r$. Let $f$ denote focal distance, $\theta$ the phase angle of the wave at any radius $r$ in the plane at the lens and $\mu$ the refractive index. It may be shown that $$d=\frac{\lambda}{\mu-1}\left(1-\frac{\sqrt{f^2+r^2}-f}{\lambda}\right)$$

As $r$ increases $d$ decreases until the right-hand term in the parenthesis equals 1. Then $d=0$ and $r$ is the radius of the lens (with zero thickness at the edge).

When experimenting with a lens made of polystyrene mounted in a viewing device of the kind shown in Fig. 1, but with no aperture in the lens, applicant discovered that a visible optical image was formed upon screen 8. Thus it is seen that the refractive indexes of this material for waves in the respective two ranges of wavelengths used are such that the material is suitable for forming the two images with the same lens element. Other dielectric lens materials having the properly related values of refractive index could also, of course, be similarly used.

Fig. 2 illustrates a device like that of Fig. 1 but with a single lens member 4' substituted for the lens assembly 4, 6 of Fig. 1, the middle portion 6' of this lens member being used to form the optical image on screen 8. This middle portion is, of course, uncorrected for optical aberrations and this modification is therefore not as suitable as the arrangement of Fig. 1 if an optical image of high quality is desired. The greater the portion 6' of lens 4' used to form the optical image, the poorer is the quality of this image because of the absence of correction for optical aberrations.

The manner in which the above-described device may be used will be clear from the above description and discussion of it.

It will be obvious that the emanation of waves from the object field may be due to direct radiation from the the objects in the field or to waves reflected from objects in the field or in part to each. If the field is "illuminated" with waves in each of the wavelength ranges employed from outside sources, the two images will be formed respectively by such waves within the two ranges as are reflected by objects or parts of objects to the viewing, or camera, device. If, for example, a field containing metal objects is "illuminated" with short radio waves (microwaves) these objects will strongly reflect the waves whereas both metallic and nonmetallic objects in a field may strongly reflect waves to which the eye is sensitive when the field is illuminated with ordinary light.

It will be understood that the embodiment of the invention described above is merely illustrative, as is the wavelength ranges mentioned as suitable for use with that embodiment. The appended claims define the various aspects of the invention.

What is claimed is:

1. Means for detecting a source of emanation of electromagnetic waves of wavelength within a band of wavelengths and its position relative to neighboring objects in an object field which comprises means for forming an image of the object field with electromagnetic waves of such different wavelength that said image contains no information identifying any particular object in said field as being said source of emanation of electromagnetic waves, and means for focussing waves of said first-mentioned wavelength from said source in the region of said image and there utilizing the focussed waves to produce an image of said source displaced from, but located in proximity to, that portion of said first image corresponding to the position of said source in said field.

2. Means for utilizing electromagnetic waves from an object field to obtain information concerning said field comprising means for focussing waves from said field within a certain wavelength range, means for focussing additional waves from said field outside said range which excludes waves within said range, means relatively positioning said two focussing means so that focal points of two sets of waves focussed by said two means respectively and emanating respectively from any two juxtapositioned elements of said field are juxtapositioned, and separate means in the foci region respectively selectively responsive to said two sets of waves.

3. The combination of claim 2 in which said two focussing means have the same principal axis.

4. The combination with means for forming an image of an object field with electromagnetic waves within a certain wavelength range, of means for focussing in the region of the plane of said image electromagnetic waves from said field which are outside said range, said last-mentioned means including means to exclude from said means waves within said certain wavelength range, and means for receiving said last-mentioned focussed waves and converting them into rays within said range.

5. The combination of claim 4 in which said second means comprises a relatively large wave deflecting member, and said first means comprises a relatively small wave deflecting member, said members having the same principal optical or wave axis.

6. The combination of claim 4 in which the last-mentioned means is adapted to transform short radio waves into rays within the visible range.

7. The combination of claim 4 in which said second-mentioned means comprises a relatively large lens element and a gas-filled cell for receiving waves focussed by said lens element and said first-mentioned means comprises a relatively small lens element having its optical axis passing through the center of said relatively large lens element, and a translucent screen adjacent said cell for receiving rays focussed by said relatively small lens element.

8. An electromagnetic wave device comprising means for receiving electromagnetic waves within a wavelength range outside that to which the eye is responsive and converting them into electromagnetic waves within the range to which the eye is responsive, a lens element for receiving from an object field electromagnetic waves within said first-mentioned range and focussing them upon said converting means to form an image of any portion of the field from which rays within said first-mentioned range emanate, all but a portion of said lens element being opaque to electromagnetic waves to which the eye is responsive and said portion being capable of focussing rays to which the eye is responsive in the region of said converting means to there form an image of objects within said field, corresponding elemental portions of said two images of the same part of the field being substantially aligned in the general direction of the principal axis of said lens element.

9. In combination, an electromagnetic wave focussing element for imaging an object field with rays within a wide range of wavelengths a portion of which element is effective for waves within a part only of said range, and means positioned in the region of the focus of said element for receiving the focussed rays and forming two substantially superimposed images, one with waves received from said portion only and the other with waves at least some of which are received from the part of said element outside said portion.

10. The combination of claim 9 in which said focussing element is a lens element the outer portion of which constitutes said opaque portion.

11. A device for detecting a source of invisible emanation of electromagnetic waves and its position relative to neighboring objects in an object field which comprises means for forming an image of the object field with electromagnetic waves of such length that said image contains no information identifying any particular object in said field as being said source of invisible emanation of electromagnetic waves and means for focussing the invisible waves from said source in the region of said image and there utilizing them to form an image of said source displaced from said first image but aligned therewith so that a line from a position on or near the axis of the beam forming said first image and passing through the image of said source passes through the position in the field of said first image corresponding to the position of said source in the object field.

12. A device for detecting a source of emanation of electromagnetic waves of length of the order of one to ten millimeters and its position relative to neighboring objects in an object field which comprises a screen member upon which an image may be formed with light rays, means for utilizing light from the field to form an image of objects within the field on said screen member, a second screen member sensitive to waves of length of the order mentioned above positioned adjacent said first screen member in superimposed relationship thereto, and means for utilizing waves of said order of length emanating from said source to form an image of said source on said second screen member superimposed on the portion of said first image corresponding to the position of said source in said field.

13. The combination with a lens member adapted to refract electromagnetic waves of one length and also waves of length materially different therefrom to form images, means for rendering a portion only of said lens member ineffective to form images by refracting waves of said first length but not by refracting waves of said different length, said portion being concentric with the remaining portion, and wave responsive means for simultaneously receiving waves of both said lengths from said lens member in the form of superimposed images, two portions of which means selectively respond respectively to said two wavelengths.

14. The combination of claim 13 in which said lens member is of the same material throughout and said remaining portion is a sectional central portion of said member having the same principal axis as the remaining portion.

15. The combination of claim 13 in which the material of said lens member is polystyrene and said remaining portion is a sectional portion surrounding and including the principal axis.

References Cited in the file of this patent

UNITED STATES PATENTS

| | | |
|---|---|---|
| 1,517,332 | Wood | Dec. 2, 1924 |
| 1,605,016 | Trezise | Nov. 2, 1926 |
| 1,948,552 | Weber et al. | Feb. 27, 1934 |
| 1,954,755 | Heine | Apr. 10, 1934 |
| 1,959,264 | Dugan | May 15, 1934 |
| 1,979,159 | Howser | Oct. 30, 1934 |
| 1,990,494 | Murphy | Feb. 12, 1935 |
| 2,155,471 | Cawley | Apr. 25, 1939 |

FOREIGN PATENTS

| | | |
|---|---|---|
| 27,572 | Great Britain | Dec. 16, 1903 |
| 193,969 | Great Britain | Mar. 2, 1923 |
| 373,290 | Great Britain | May 26, 1932 |